(12) United States Patent
Miller et al.

(10) Patent No.: US 8,834,996 B2
(45) Date of Patent: Sep. 16, 2014

(54) LIGHTWEIGHT SYNTACTIC FOAMS FOR BLAST MITIGATION IN THERMAL/ACOUSTIC FLOORING

(75) Inventors: Chad Edward Miller, Florence, MT (US); Sarah Parsons, London, OH (US); James E. Haylett, Pataskala, OH (US); Stephen Mikes, Granville, OH (US)

(73) Assignee: CVG Management Corporation, New Albany, OH (US)

( * ) Notice: Subject to any disclaimer, the term of this patent is extended or adjusted under 35 U.S.C. 154(b) by 142 days.

(21) Appl. No.: 13/567,510

(22) Filed: Aug. 6, 2012

(65) Prior Publication Data

US 2013/0202874 A1 Aug. 8, 2013

Related U.S. Application Data

(60) Provisional application No. 61/515,444, filed on Aug. 5, 2011.

(51) Int. Cl.
| | |
|---|---|
| *B32B 5/32* | (2006.01) |
| *B32B 5/14* | (2006.01) |
| *B32B 37/16* | (2006.01) |
| *B32B 7/02* | (2006.01) |
| *B60N 3/04* | (2006.01) |
| *B62D 25/20* | (2006.01) |
| *F41H 5/04* | (2006.01) |
| *B60N 2/42* | (2006.01) |
| *F41H 7/04* | (2006.01) |
| *B60R 13/08* | (2006.01) |

(52) U.S. Cl.
CPC . *B62D 25/20* (2013.01); *B32B 7/02* (2013.01); *B60N 3/048* (2013.01); *F41H 5/0492* (2013.01); *B32B 2307/102* (2013.01); *B32B 5/145* (2013.01); *B60N 2/4242* (2013.01); *B32B 2471/00* (2013.01); *B32B 2264/00* (2013.01); *B32B 2605/00* (2013.01); *F41H 7/042* (2013.01); *B32B 5/32* (2013.01); *B60R 13/0815* (2013.01); *B32B 2307/304* (2013.01)
USPC .............. 428/316.6; 428/310.5; 428/317.9; 156/60

(58) Field of Classification Search
USPC ............... 428/316.6, 310.5, 317.9; 156/60
See application file for complete search history.

(56) References Cited

U.S. PATENT DOCUMENTS

| | | | |
|---|---|---|---|
| 4,665,794 A * | 5/1987 | Gerber et al. | 89/36.02 |
| 2009/0107059 A1* | 4/2009 | Kipp et al. | 52/144 |
| 2011/0212320 A1* | 9/2011 | Greenhill et al. | 428/313.3 |

* cited by examiner

*Primary Examiner* — Hai Vo
(74) *Attorney, Agent, or Firm* — Kegler Brown Hill & Ritter; James J. Pingor

(57) ABSTRACT

A flooring system for use in thermal and/or acoustic floor systems is provided where the flooring system mitigates external forces from a shock/blast wave. The flooring system includes a foam layer and filler material that includes micro and/or nano structures strategically dispersed in the foam layer. The micro and/or nano structures mitigate a magnitude of the external forces propagating through the foam layer.

9 Claims, 5 Drawing Sheets

LIGHTWEIGHT SYNTACTIC FOAMS FOR BLAST MITIGATION IN THERMAL/ACOUSTIC FLOORING

CROSS-REFERENCE TO RELATED APPLICATIONS

This application claims the benefit of U.S. Provisional Patent application Ser. No. 61/515,444 entitled "LIGHTWEIGHT SYNTACTIC FOAMS FOR BLAST MITIGATION IN THERMAL/ACOUSTIC FLOORING" filed on Aug. 5, 2011. The entireties of the above-noted applications are incorporated by reference herein.

BACKGROUND

Acoustical and thermal insulators and liners for application to vehicles are well known in the art. These insulators typically rely upon both sound absorption, e.g., the ability to absorb incident sound waves and transmission loss, and the ability to reflect incident sound waves, in order to provide sound attenuation. Convention flooring solutions also rely upon thermal shielding properties to prevent or reduce the transmission of heat from various heat sources (e.g., engine, transmission and exhaust system) to the passenger compartment of the vehicle.

Over the years a number of adhesives, adhesive webs and binding fibers have been specifically developed to secure the various layers of the laminates together, however laminated flooring system still have an inherent risk of delamination and failure. The potential is, in fact, significant mainly due to the harsh operating environment to which vehicle flooring systems are subjected.

Additionally, conventional flooring designs, e.g., SKYDEX™ flooring, have been developed to replace less effective cushioning and protective products used in traditional flooring solutions. Unfortunately, these purely twin hemispherical designs have drawbacks, especially in situations where the force is not "normal," e.g., non-linear.

Thus, there is a need in the art for a flooring solution that can provide an adequate cushioning response while at the same time an ability to alleviate non-linear forces.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In accordance with aspects of the innovation, a foam flooring system for use in thermal and/or acoustic floor systems is provided where the foam flooring system mitigates external forces from a shock/blast wave. The foam flooring system includes a foam layer and filler material that includes micro and/or nano structures strategically dispersed in the foam layer. The micro and/or nano structures mitigate a magnitude of the external forces propagating through the foam layer.

In accordance with another aspect of the innovation a thermal/acoustic flooring system is provided and includes a plurality of foam layers and filler material dispersed in the plurality of foam layers, wherein the filler material mitigates a magnitude of external forces propagating through the foam layer.

The innovation disclosed and claimed herein, in one aspect thereof, comprises systems (and methods) that facilitate flooring solutions capable of absorbing non-linear forces. In aspects, lightweight, syntactic foams can be employed for blast mitigation in thermal and acoustic flooring solutions.

In particular aspects, syntactic foam can be engineered with specific compositions and/or gradients so as to exhibit enhanced compression and acoustical properties as compared to conventional materials and designs.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
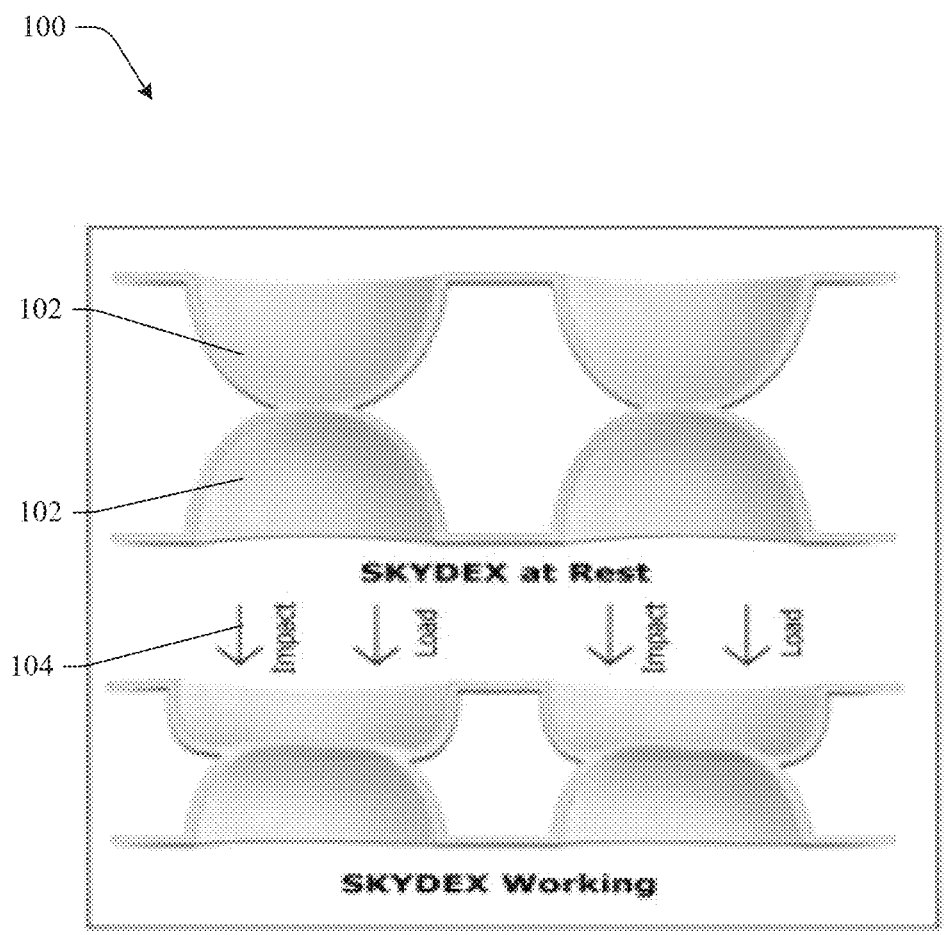
FIG. 1 illustrates an example of a conventional SKYDEX™ flooring system in accordance with conventional designs.

The innovation is now described with reference to the drawings, wherein like reference numerals are used to refer to like elements throughout. In the following description, for purposes of explanation, numerous specific details are set forth in order to provide a thorough understanding of the subject innovation.

Referring initially to the drawings, FIG. 1 illustrates a typical and conventional flooring system 100 in accordance with aspects of the innovation. One such product name of a conventional system similar to that of FIG. 1 is SKYDEX™. The foam shown in FIG. 1 is created by molding engineered plastics into chemically bonded twin hemisphere structures 102, creating thin, lightweight, strong and custom products that can replace less effective cushioning and protective products. While the twin hemisphere technology absorbs shock in less space and provides many secondary benefits than some other conventional designs, the response of SKYDEX™ is limited to normal forces, as indicated by the arrows 104. The innovation disclosed herein provides an alternative foam design that addresses not only normal forces, but all forces from any direction.

Figure 2:
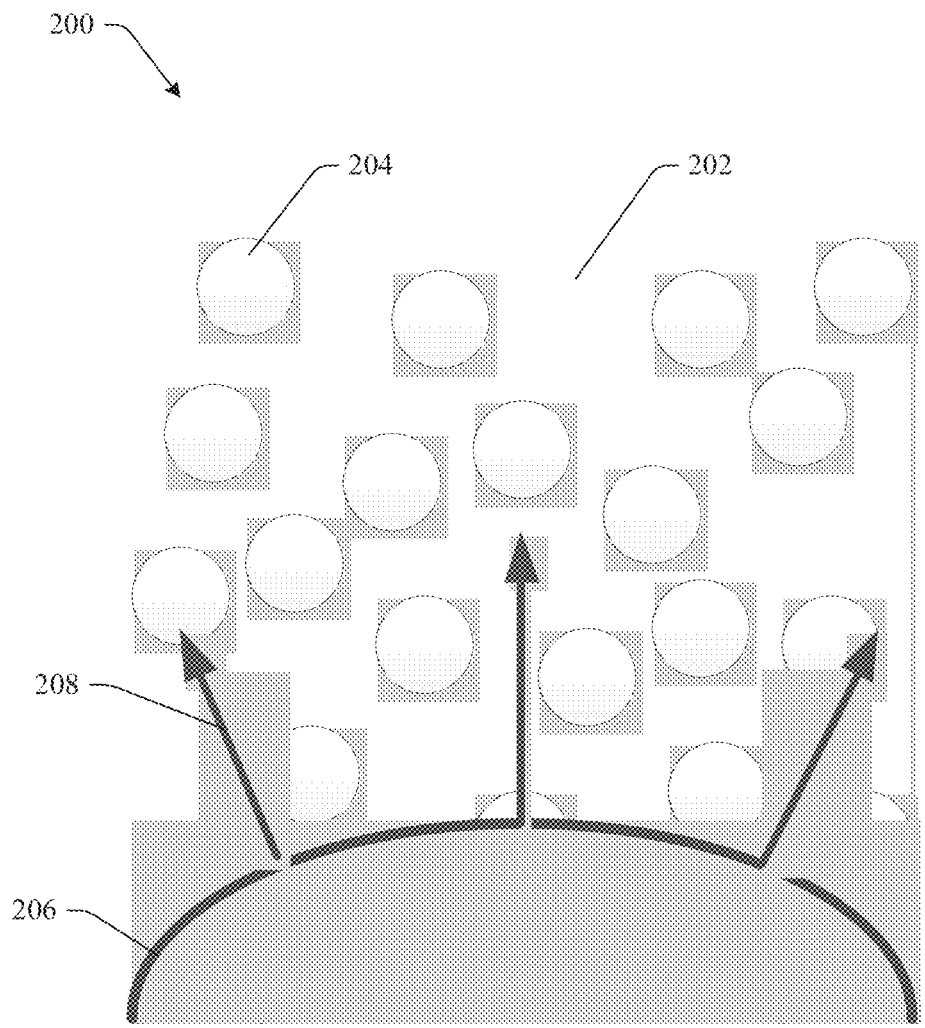
FIG. 2 illustrates performance characteristics of a foam flooring system in accordance with aspects of the innovation.

Referring now to FIG. 2, FIG. 2 is an illustration of an example embodiment of a foam flooring system 200 for a thermal and/or acoustic flooring system in accordance with an aspect of the innovation. The flooring system 200 includes a foam, such as but not limited to a syntactic foam, layer 202 and a filler material 204. The filler material 204 is comprised from different materials that have different sized wall thicknesses, micro-structures, micro-balloons, nanoparticles, etc. (collectively "internal structures"), which allows for design flexibility in dealing with shock waves with signature amplitudes and frequencies. In other words, the filler material 204 increases the foam flooring system's 200 ability to withstand dynamic loads and mitigate a magnitude of a force from the dynamic loads due to the collapse of the internal structures, dissipation of blast wave energy, and the resultant reduction of overpressure.

In addition, the ability to effectively engineer and tune the flooring system 200 is further enhanced by the controlled placement of the filler material 204, as described below. For example, as a wave (e.g., shock, blast, etc.) 206 contacts the flooring system 200, forces 208 from the shock wave 206 are dispersed in different directions. Because the filler material 204 can be introduced in a controlled manner into the foam layer 202, the filler material 204 mitigates the forces 208 as they travel (propagate) through the flooring system 200. As a result, the multi-modality that may be incorporated in a foam (e.g., syntactic foam) facilitates the design of an isotropic flooring system that effectively absorbs energy regardless of the angle of incidence, e.g., of the blast wave. Whereas, as mentioned above, the response of a conventional system such as the Skydex™ material, is effective only for normal (e.g., lateral, up/down) forces.

Figure 3A:
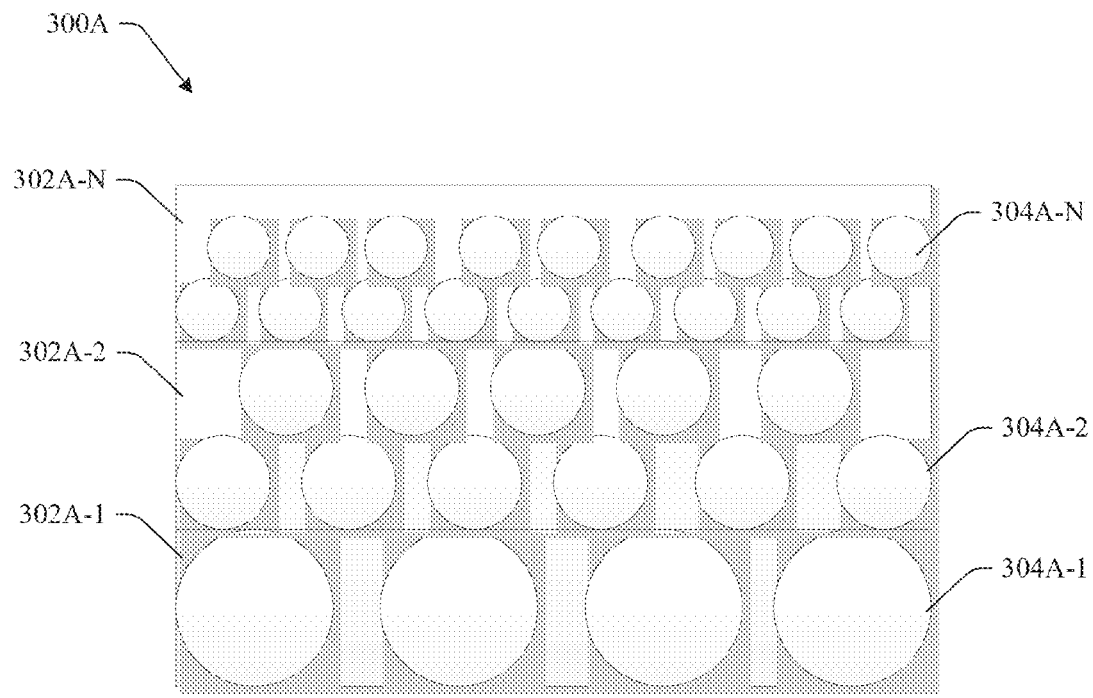
FIG. 3 illustrates example aspects of engineered foam in accordance with aspects of the innovation.
Figure 3B:
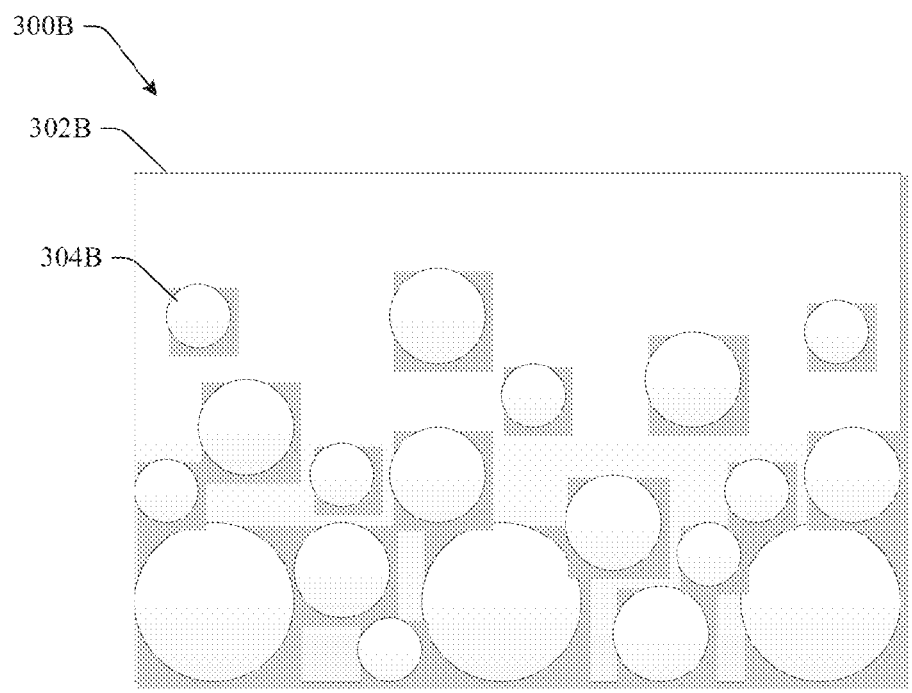

FIGS. 3A and 3B illustrate two additional example embodiments of a foam flooring system in accordance with aspects of the innovation. FIG. 3A is an illustration of a multi-layered foam flooring system 300A that includes multiple foam layers referenced as 302A-1, 302A-2 . . . 302A-N. Foam layer 302A-1 is the layer that is closest to a point of entry of external forces into the foam flooring system 300A and 302A-N is the layer furthest from the point of entry of the external forces into the foam flooring system 300A. The number of foam layers may vary depending on several factors, such as application. Filler material, which is referenced as 304A-1, 304A-2 . . . 304A-N, is dispersed through each foam layer 302A-N, such that the filler material 304A-1, 304A-2 . . . 304A-N decreases in size with each additional foam layer 302A-N. In other words, the largest filler material 304A-1 is in the bottom most foam layer 302A-1, the second largest filler material 304A-2 is in the second from the bottom foam layer 302A-2, etc. It is to be understood, however, that the arrangement of the foam layers 302A-N can be reversed or interchanged in any order. In addition, the filler material 304A-N is arranged in an organized pattern such that any forces traveling through the multi-layered floor system 300A are mitigated by the filler material 304A-1, 304A-2 . . . 304A-N.

FIG. 3B is an illustration of a foam layer gradient system 300B that includes a foam layer 302B and filler material 304B. Although, it appears that the filler material 304B is randomly dispersed throughout the foam layer 302B, the filler material 304B is strategically arranged in the foam layer 302B such that any forces traveling through the multi-layered floor system 300A are mitigated by the filler material 304B. In addition, the filler material 304B may include various sized material to facilitate the mitigation of forces traveling the flooring system 300B.

The filler material 304A-N, 304B illustrated in FIGS. 3A and 3B may be introduced via most any spray equipment for the multi-layered or gradient type flooring system 300A, 300B. In addition, the filler material 304A-N, 304B may also be introduced selectively to the areas other than flooring requiring protection of personnel, e.g., for cost saving initiatives. Although the foam flooring systems 300A, 300B illustrated in FIGS. 3A and 3B are described separately, the two embodiments can be combined to form a multi-layered flooring system where all or some of the layers employ the gradient system.

Figure 4:
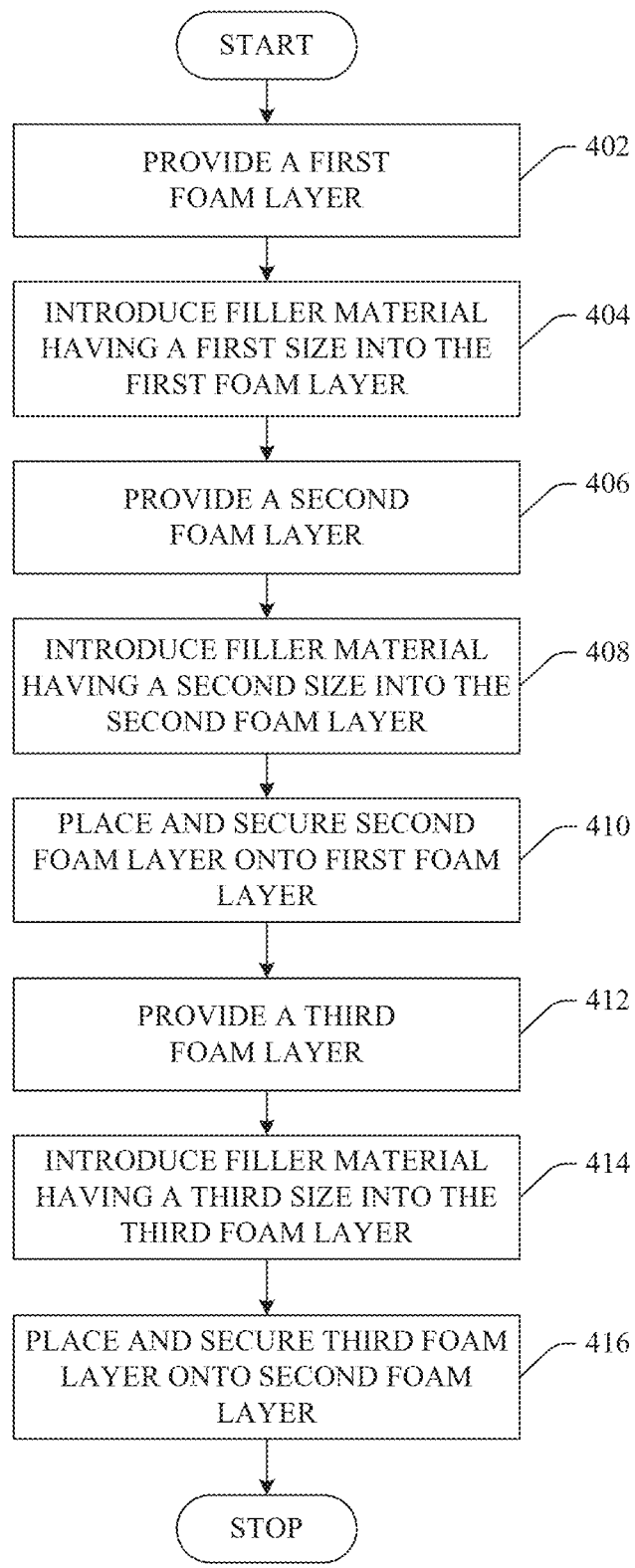
FIG. 4 is a flow chart illustrating a method of manufacturing a foam flooring system in accordance with aspects of the innovation.

Referring now to FIG. 4, a method of manufacturing a foam flooring system will now be described in accordance with aspects of the innovation. Specifically, a multi-layered foam flooring system 300A described above in reference to FIG. 3A will be described. For simplicity and illustration only, the multi-layered foam flooring system 300A will be limited to three layers. At 402, a first foam layer 302A-1 as described above is provided. At 404, a filler material 304A-1 having a first size is introduced into the first foam layer 302A-1 as described herein. At 406, a second foam layer 302A-2 as described above is provided. At 408, a filler material 304A-2 having a second size is introduced into the second foam layer 302A-2 as described herein. At 410, the second foam layer 302A-2 is placed on top of the first foam layer 302A-1 to form a two-layered foam flooring system. At 412, a third foam layer 302A-3 as described above is provided. At 414, a filler material 304A-3 having a third size is introduced into the third foam layer 302A-3 as described herein. At 416, the third foam layer 302A-3 is placed on top of the second foam layer 302A-2 to form the three-layered foam flooring system 300A.

Figure 5:
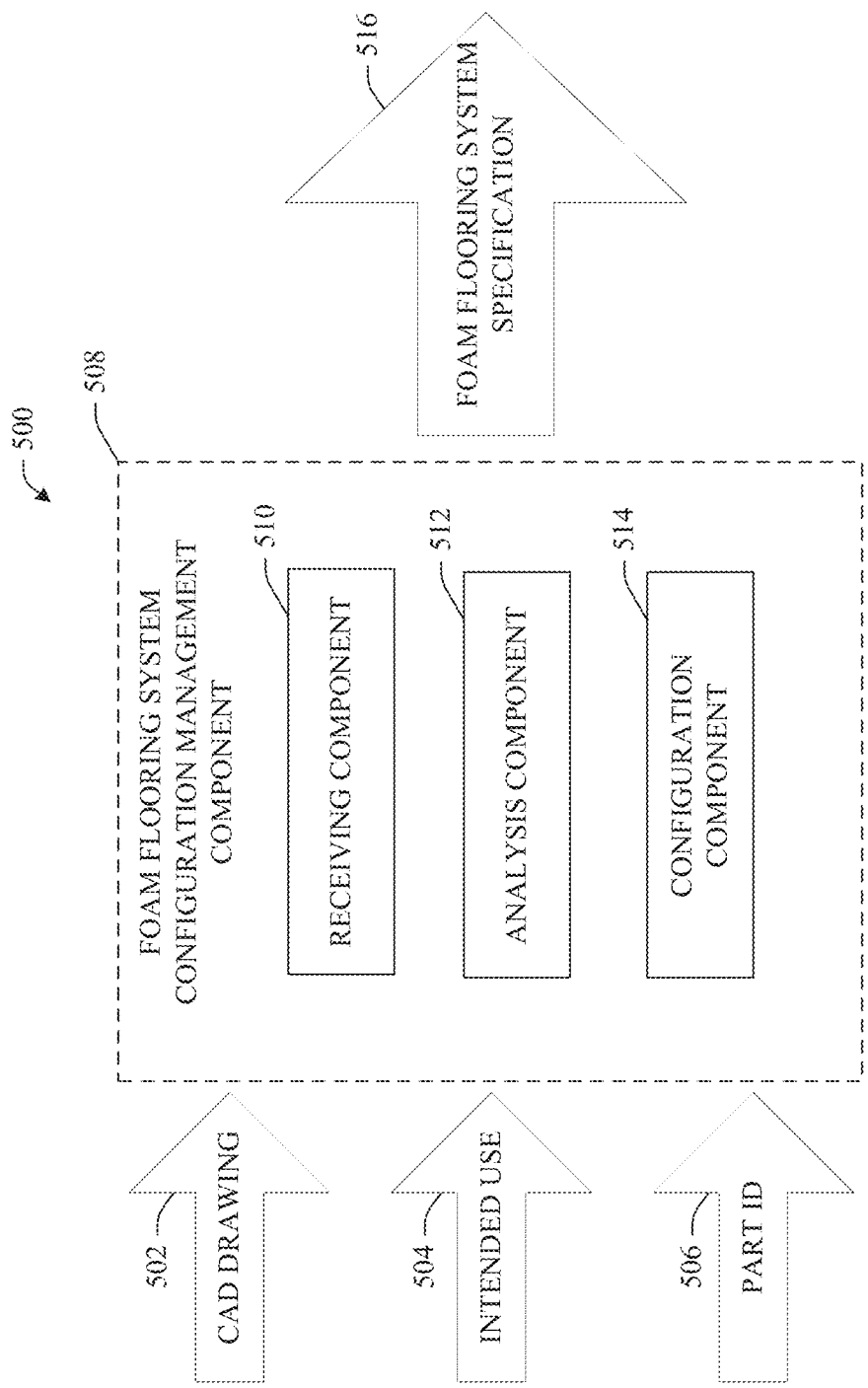
FIG. 5 is an illustration of a schematic block diagram of an exemplary computing system in accordance with aspects of the innovation.

With reference to FIG. 5, it will be appreciated that the foam flooring system can be automatically designed using computer automation. Specifically, a foam flooring system specification or design may be obtained with the analysis of various parameters input into a computer system 500. For example, some but not all input parameters may include information from a CAD drawing 502, the intended use 504 of the part, part identification 506, etc. Information from the CAD drawing 502 may include dimensions, locations of holes, cutouts, bends, etc. Intended use 504 may include information such as where the part will be installed in the vehicle, orientation of the part, how the part will interface with other parts in the vehicle, etc. The part identification 506 may include a part number, part description, the weight of the part, etc.

The input parameters may be input into a foam flooring system configuration management component 508 of the computer system 500 where the information is processed. The flooring product configuration management component 508 may include several processing components, such as but not limited to a receiving component 510, an analysis component 512, and a configuration component 514. The receiving component 510 receives the information from the input parameters and sends the input information to the appropriate component within the flooring product configuration management component 508. The analysis component 512 analyzes the information from the input parameters to determine an optimum foam flooring system configuration. Finally, the configuration component 514 configures the foam flooring system based on the resulting information from the analysis component 512.

The information from the foam flooring system configuration management component 508 is output in the form of a specification. For example, the optimum foam flooring system configuration may be output in the form of a foam flooring system specification 516, which is used to fabricate the part.

It is to be understood and appreciated that each of the innovation's techniques can incorporate heated molds for the production of contoured parts tailored to the thermal, acoustic and/or blast mitigation requirements of a specific vehicle platform or design. In other words, the features, functions and benefits of the innovation can be applied to most any application where conventional foams and materials have been traditionally used for thermal, acoustical and/or blast mitigation. Implementations and uses in addition to flooring systems are contemplated and to be included within the scope of this disclosure. For instance, the innovation can be applied to oxygen cylinder overpacks, vehicle interior parts and panels, headliners, etc.—all such contemplated applications of the innovation are to be considered within the scope of this specification and claims appended hereto.

It is to be appreciated that the technologies that support the innovation include, but are not limited to RIM (Reaction Injection Molding), R-RIM (Reinforced Reaction Injection Molding), spray skin, SIA (Solid Injection by Airstream™) (Hennecke™) among others. Use of the innovation in these and other manufacturing processes are contemplated and included with the specification's scope.

While the discussion herein is directed mainly to the engineered product, it is to be understood that the scope of this innovation is also to include systems (e.g., computer systems, software and machinery) capable of designing, engineering and manufacturing the lightweight syntactic foams for use in thermal and/or acoustic flooring solutions. Further, associated methodologies are also to be considered within the scope of this specification.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A thermal/acoustic flooring system comprising:
   a plurality of foam layers; and
   a filler material comprising a plurality of microparticles or nanoparticles randomly dispersed and completely separated from each other in each foam layer,
   wherein the filler material mitigates a magnitude of the external forces propagating through the plurality of foam layers,
   wherein the plurality of foam layers are placed on top of one another to form a multi-layered flooring system, and
   wherein the filler material has a particle size gradient throughout a thickness of the thermal/acoustic flooring system such that the filler material in a foam layer closest to an entry of the external forces into the flooring system has a particle size greater than that of the filler material in a foam layer furthest away from the external forces into the flooring system.

2. The flooring system of claim 1, wherein the plurality of foam layers includes a first foam layer, a second foam layer placed on a top of the first foam layer, and a third foam layer placed on top of the second foam layer.

3. The flooring system of claim 2, wherein the first foam layer comprises a first filler material with a first particle size, the second foam layer comprising a second filler material with a second particle size, the third foam layer comprising a third filler material with a third particle size, wherein the first particle size is greater than the second particle size, and wherein the second particle size is greater than the third particle size.

4. The flooring system of claim 2, wherein the first filler material, the second filler material, and the third filler material is introduced into each respective foam layer via a spray device.

5. The flooring system of claim 1, wherein the microparticles or nanoparticles are strategically placed in the foam layer and having the appearance of a random dispersion.

6. A method of manufacturing a multi-layered thermal/acoustic flooring system comprising:
   providing a plurality of foam layers;
   dispersing a filler material comprising a plurality of microparticles or nanoparticles randomly dispersed and completely separated from each other in each foam layer;
   wherein the filler material mitigates a magnitude of external forces propagating through the foam layer,
   wherein the plurality of foam layers are placed on top of one another to form a multi-layered flooring system,
   wherein the filler material has a particle size gradient throughout a thickness of the thermal/acoustic flooring system such that the filler material in a foam layer closest to an entry of the external forces into the flooring system has a particle size greater than that of the filler material in a foam layer furthest away from the external forces into the flooring system.

7. The method of claim 6, wherein the plurality of foam layers include a first foam layer having a first filler material, a second foam layer having a second filler material, and a third foam layer having a third filler material.

8. The method of claim 7, wherein the first filler material has a first particle size, the second filler material having a second particle size, the third filler material having a third particle size, wherein the first particle size is greater than the second particle size, and wherein the second particle size is greater than the third particle size.

9. The method of claim 7, wherein the first filler material, the second filler material, and the third filler material is introduced into each respective foam layer via a spray device.

* * * * *